Jan. 9, 1945.  H. R. BLUMSTENGEL  2,367,094
HEATING STOVE
Filed May 4, 1942   4 Sheets-Sheet 4
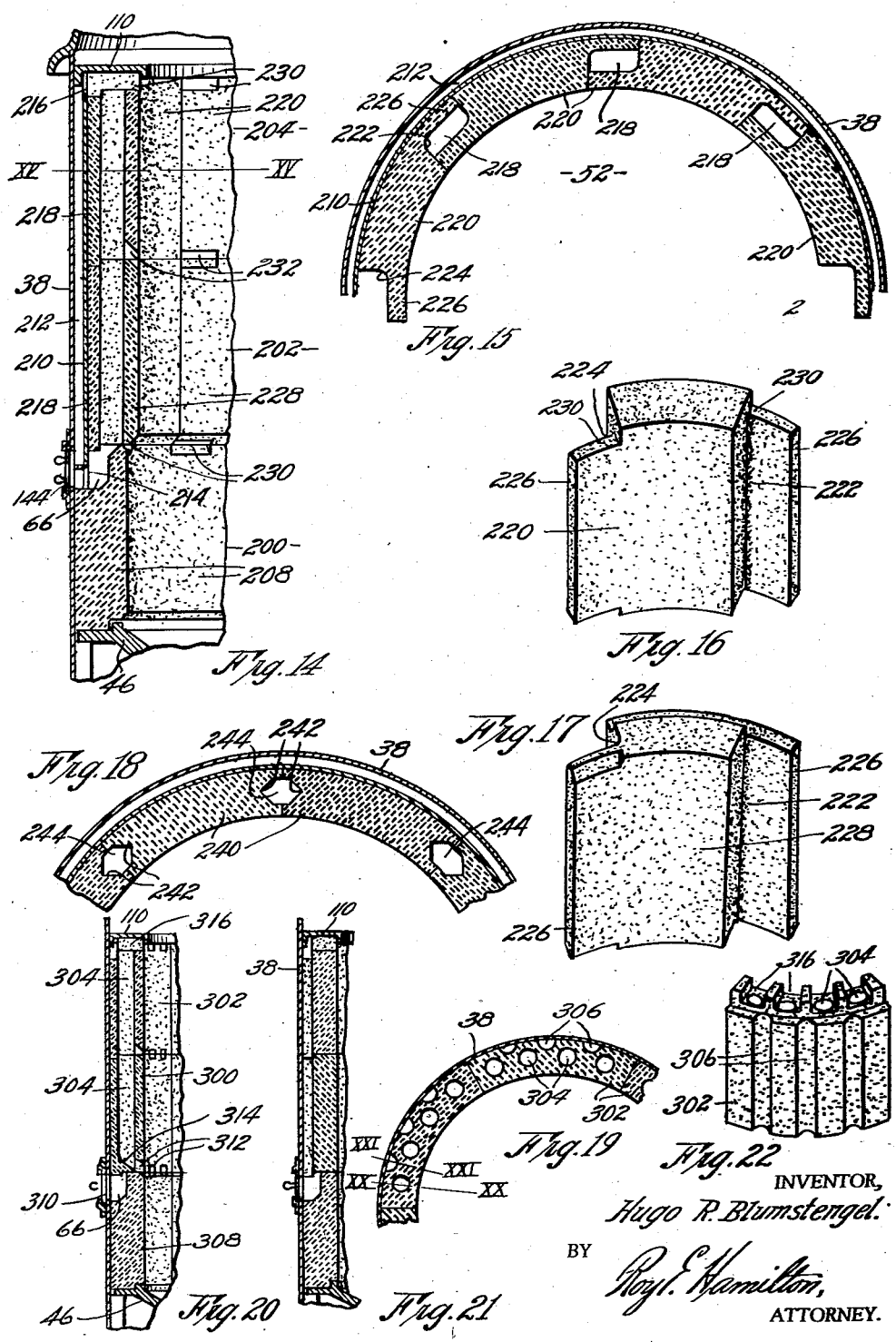
INVENTOR,
Hugo R. Blumstengel.
BY
Roy E. Hamilton,
ATTORNEY.

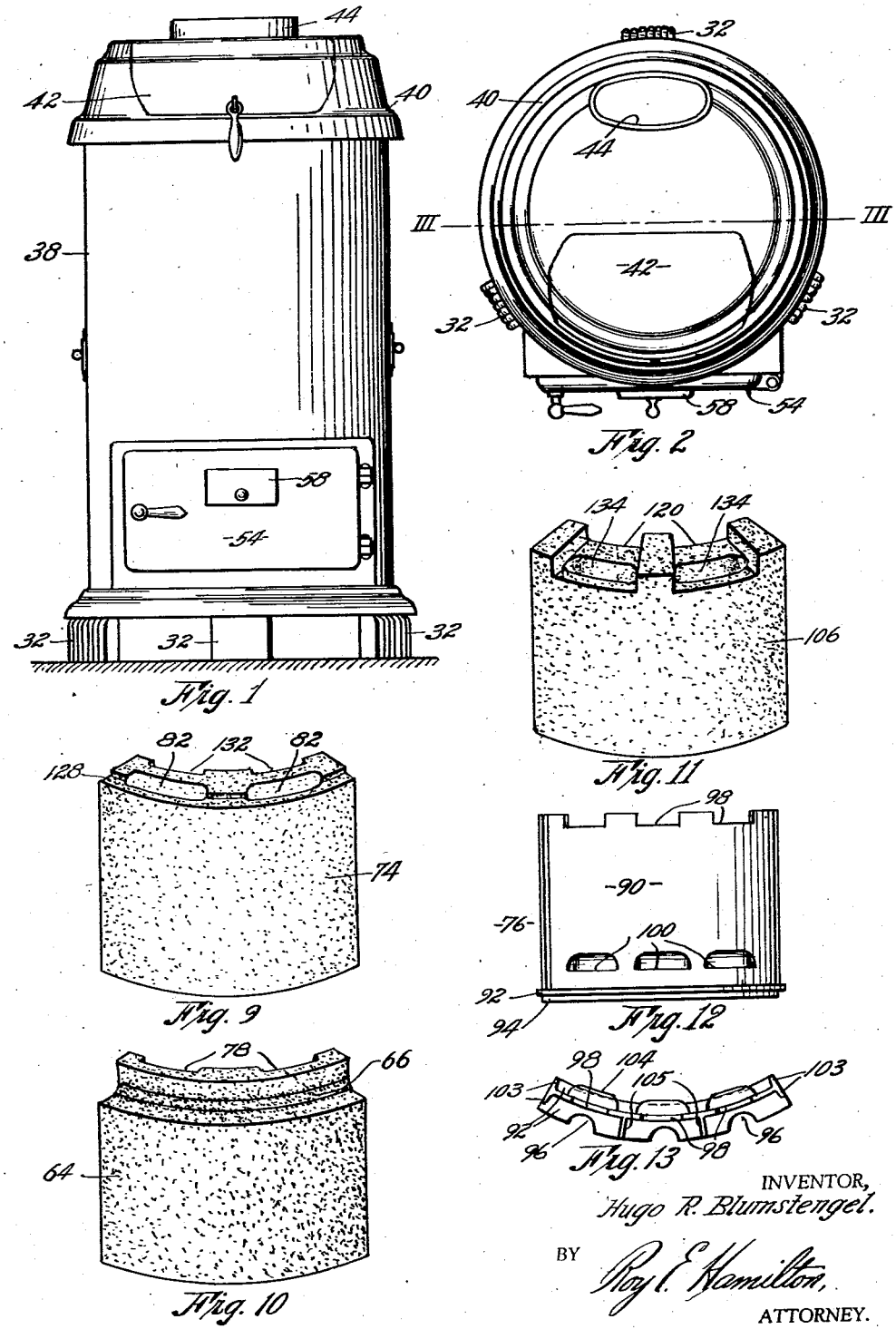

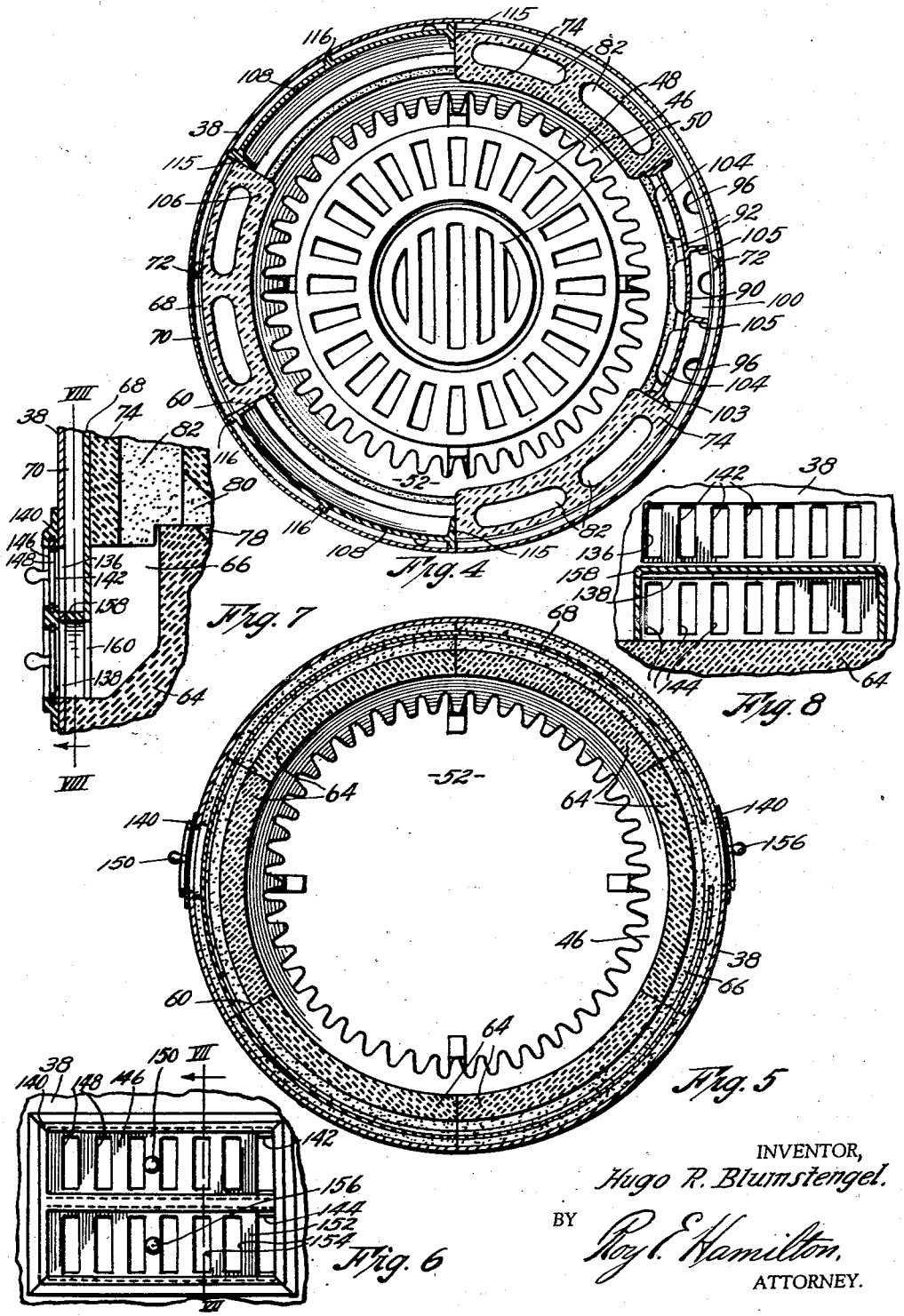

Patented Jan. 9, 1945

2,367,094

UNITED STATES PATENT OFFICE 2,367,094

HEATING STOVE

Hugo R. Blumstengel, Kansas City, Mo.

Application May 4, 1942, Serial No. 441,745

8 Claims. (Cl. 126—73)

This invention relates to improvements in heating stoves and has for its principal object the provision of a heating stove wherein a portion of the gases generated in the fuel bed are directed through flues and intermixed with air then burned to produce a heated zone above the fuel bed.

The contemplated heating stove provides a reservoir or combustion chamber adapted to receive a relatively large charge of solid fuel, such as coal, wherein it may be coked before it burns down. In order to facilitate proper coking, gas passageways are provided in the side walls of the chamber to present an escape of the gases therethrough thus avoiding objectional trapping of the gas.

The principal object of the present invention is the provision of a heating stove provided with series of bricks having vertically disposed passageways in registered relation to form a plurality of ducts communicating with the combustion chamber for carrying gases generated in the fuel bed upwardly from said fuel bed.

Another object of the present invention is the provision of a heating stove having passageways in its side walls communicating with the fuel chamber whereby gases generated in the fuel bed are directed through said passageways above said fuel bed, and air ducts having control means whereby air may be intermixed with said gases adjacent the top of said passageways to produce a heated zone in the combustion chamber above the fuel bed.

A further object of this invention is the provision of a heating stove having an air control means whereby air is selectively directed to certain air ducts to control the combustion of gases collected in passageways spaced apart from the fuel chamber.

A still further object of this invention is the provision of various tier of differently constructed refractory bricks to direct and control gas and air flow.

Other objects are simplicity and economy of construction, efficiency and uniformity of operation, and adaptability for use in heating with most all types of solid fuels.

Reference will now be had to the drawings wherein:

Figure 1 is a front elevation of a heating stove embodying this invention.

Fig. 2 is a top plan view of the heating stove.

Fig. 4 is a horizontal sectional view taken on line IV—IV of Fig. 3.

Fig. 5 is a horizontal sectional view taken on line V—V of Fig. 3.

Fig. 6 is an enlarged face elevation of the air inlet control means.

Fig. 7 is a vertical sectional view taken on line VII—VII of Fig. 6.

Fig. 8 is a vertical sectional view taken on line VIII—VIII of Fig. 7.

Fig. 9 is a perspective view of one of the intermediate refractory bricks.

Fig. 10 is a perspective view of one of the bricks of the lower tier.

Fig. 11 is a perspective view of one of the fire bricks of the top tier.

Fig. 12 is an inside elevational view of one of the intermediate metal liners.

Fig. 13 is a top plan view of the metal liner shown in Fig. 12.

Fig. 14 is a vertical sectional view of a modified form of the wall construction wherein the bricks are not hollow but are fitted together so as to present passageways therebetween.

Fig. 15 is a sectional view taken on line XV—XV of Fig. 14.

Fig. 16 is a perspective view of one of the top tier of bricks.

Fig. 17 is a perspective view of one of the intermediate bricks.

Fig. 18 is a further modified form of the brick construction.

Fig. 19 is a fragmentary sectional view of a modified form of the stove construction.

Fig. 20 is a vertical sectional view taken on line XX—XX of Fig. 19.

Fig. 21 is a vertical sectional view taken on line XXI—XXI of Fig. 19.

Fig. 22 is a perspective view of one of the fire bricks shown in Fig. 19.

Figure 3:
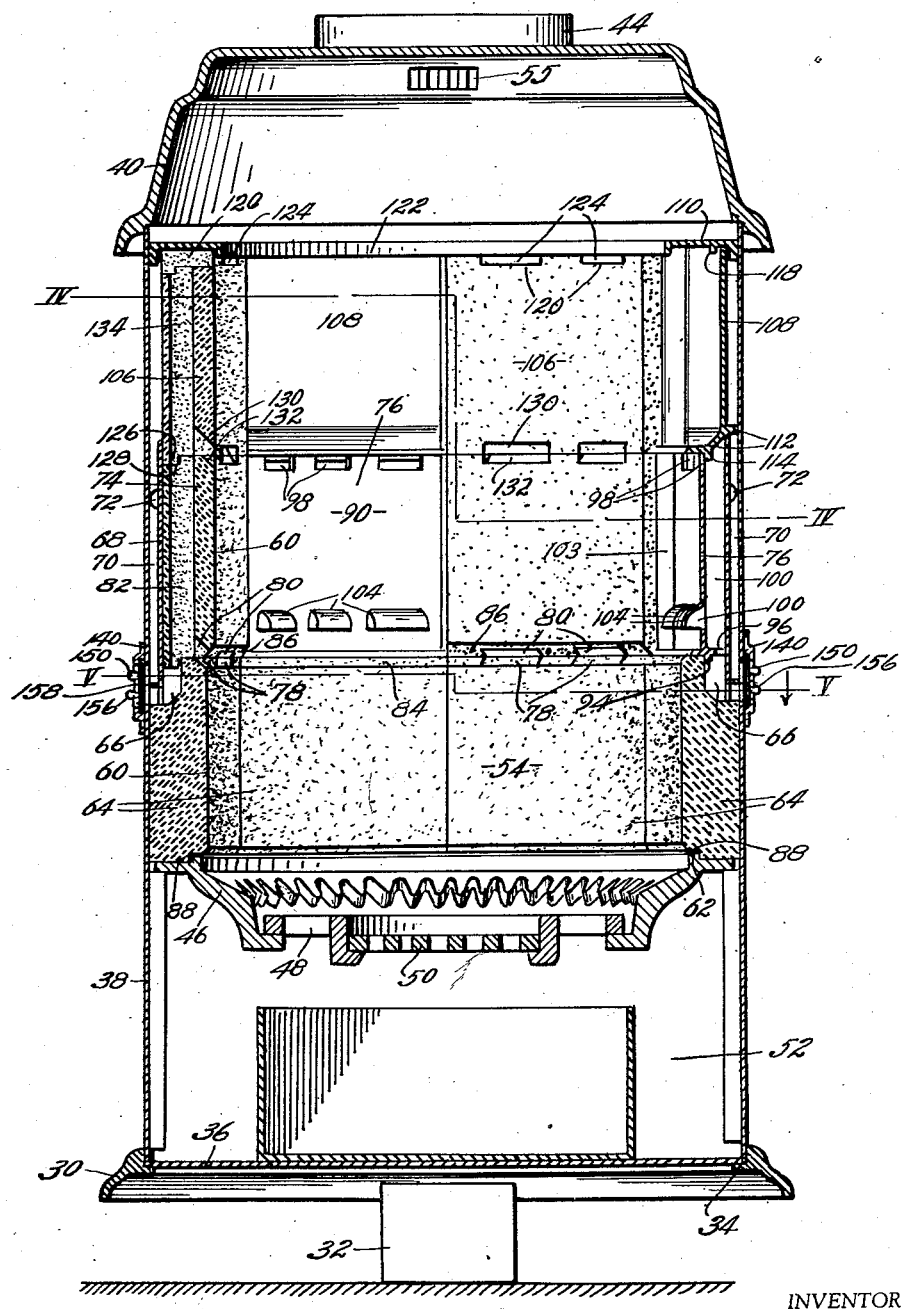
Fig. 3 is an enlarged vertical sectional view of the stove taken on line III—III of Fig. 2.

Throughout the several views like reference characters refer to similar parts and the numeral 30 designates an annular base member having depending legs 32. This base member is provided with an inturned ledge 34 on which rest a bottom disc 36. Outer casing 38 is fitted snugly into base 30 and rests on the bottom disc 36. Casing 38 extends upwardly to support the top member 40 which is provided with a feed door 42 and a smoke outlet 44. Carried in outer casing 38 intermediate the top and bottom thereof is a ring plate 46 and grate members 48 and 50 which divide the stove into an ash pit 52 and a combustion chamber 54. A manually controlled air vent 55 is provided in top member 40. The ash pit door 54 is provided with a damper 58 which is adjustable to regulate the air flow from outside the stove through the grate to the combustion chamber.

An inner lining 60 rests on ring plate and consists of various members hereinafter set forth. The ring plate 46 is provided with an upwardly projecting flange 62 spaced from outer casing 38. Resting on ring plate 46 intermediate outer casing 38 and flange 62 is a course of curved fire brick 64 which fit snugly against the inner wall of outer casing 38 and are held in position because of the close abutting relation of adjacent radial end surfaces. When all the fire brick are positioned the only way that one brick can be removed is by raising it parallel with the axis of the stove casing.

The outer upper corner of each of the fire brick 64 is recessed at 66 so as to present an annular groove around the entire circumference of the stove in which is mounted a ring liner 68 which extends upwardly above the top of brick 64 to receive the top tier of lining members. To maintain liner 68 in space relation relative to casing 38 to form a uniform air passageway 70 spacing lugs 72 may be pressed outwardly from liner 68 to rest against the inner surface of casing 38.

A tier of fire bricks 74 and metal liners 76 rest on top of fire bricks 64. The fire bricks 74 rest snugly against the inner surface of line 68 and overlap the tier of fire brick therebelow as clearly shown in Fig. 3. The notches 78 in fire bricks 64 register with notches 80 formed in fire brick 74 so as to present openings from the combustion chamber 54 to passageways 82 formed vertically through brick 74. For protection against breakage the upper edge of bricks 64 and the lower edge of bricks 74 are beveled off at 84 and 86 respectively. The bricks 64 are notched at 88 to overlap flange 62 as shown in Fig. 3. Intermediate adjacent bricks 74 are the metal liner members 76 best shown in Figs. 3, 4, 12, and 13. The arcuate body portion 90 of the liner is provided at its lower extremity with a base flange 92 which rests on the upper edge of brick 64 and against the inner wall of liner 68. A depending rib 94 extends into recess 66 to prevent displacement of the liner. The outer edge portion of flange 92 is notched at 96 to permit the flow of air therethrough from recess 66. The upper edge of body portion 90 is notched at 98 to permit the escape of air and gases entering the compartment 100 through openings 102 and notches 96. To prevent clogging or closing of openings 102 by the fuel in the combustion chamber suitable canopies 104 are formed over each of the openings, as clearly shown in Fig. 3. The vertical end flanges 103 and body flanges 105 serve to engage adjacent parts to maintain the parts in the proper operative relation when the stove is in operation.

The upper tier of fire bricks 106 and liners 108 rest respectively on bricks 74 and liner 76 beneath the cap ring 110 which is securely attached to the outer casing 38, slightly below the top edge thereof. The metal liner 108 is arcuate in form so that the body portion thereof is positioned in concentric relation with the outer casing 38 with its bottom offset flange 112 resting on the top of ring liner 68 and the liner 76. A depending rib 114 serves to engage the outer wall of liner 76 to secure the parts in operative relation.

Liner 108 is vertically ribbed on its outer surface at 116, to space the body from the inner surface of the outer casing 38; also its vertical edge flanges 115 serve to contact the adjacent bricks to preclude objectionable transverse movements of the parts. The upper edge portion of liner 108 rests behind rib 118 depending from the under surface of cap ring 110.

Referring now to bricks 106 best shown in Figs. 3, 4, and 11, it will be noted that they are arcuate in form and are adapted to snugly fit into the upper end portion of the ring liner 68 and to rest in registered relation on the brick 74 positioned therebelow. The upper end of brick 106 is transversely notched at 120. These notches extend below the lower edge of the inner flange 122 of cap ring 110 so as to present openings 124 to the combustion chamber 54. The lower end of brick 106 has a depending rim 126 which extends into a groove 128 formed in the outer top surface of brick 74, also brick 106 is notched at its inner lower edge at 130 to register with notches 132 formed in brick 74 to form inlets to passageway 134 formed vertically through the body of the brick.

Reference is now had to Figs. 6, 7, and 8 which show in detail the means for controlling the air feed to the air passages 70, 82, and 134. Openings 136 and 138 are formed through the outer casing 38 as clearly shown in Fig. 7. A frame 140 is secured to the outer surfaces of casing 38 so that a series of openings 142 formed therethrough are in register with opening 136 and another series of openings 144 are in register with opening 138 formed through casing 38. A shutter member 146 slidably mounted in frame 140 is provided with a series of openings 148 which may register with openings 142 to permit a free flow of air from outside the stove to passageway 70. A knob 150 is provided for operating shutter 146 to vary the quantity flow of air. A shutter 152, with a series of openings 154, is slidably mounted in frame 140 to regulate the flow of air through openings 144. Shutter 152 carries an operating knob 156. In order to direct air entering through openings 144 into passageway 82 and air passing through openings 142 into passageway 70, a U-shaped partition 158 is positioned between outer casing 38 and ring liner 68. It will be noted that ring liner 68 is notched out at 160 to register with opening 138 so that air passing through opening 144 will be directed through opening 160, recess 66, thence to passageway 82. Since the recess 66 extends entirely around the stove, as described above, the air will travel therearound and be distributed to the various vertical passageways 82. Furthermore, air will also pass from annular recess 66 through notches or openings 96 formed in line 76 to compartments 100.

In the operation of this heating stove, the combustion chamber is substantially filled with any desired fuel, such as coal, coke, wood, etc., and ignited. The air draft 58 is adjusted to admit a sufficient amount of air to support the proper combustion. Shutters 146 and 152 are also adjusted to admit the desired amount of outside air to the air ducts as described above. A portion of the gases generated in the fuel by the heat will pass through the openings 180 and 130 to the vertical passageways and also through openings 102 to compartments 100. Combustion in these passageways and compartments may be maintained when the shutter 152 is moved to the open position. However, if the shutter 152 is closed, the gases will be delivered through openings 98 and 124 so that if shutter 146 is moved to the open position, air will be delivered to the annular passageway 70 to notches 120 where it will mix with the gases traveling through passageway 134 and burned when delivered through openings 124. The burning of these gases above the fuel bed will create a heated zone so that unburned gases traveling upwardly from the fuel bed will be ignited, thus insuring more complete combustion. It is quite apparent that at the different stages of firing this heating stove, it would be best to vary the drafts in order to obtain the most efficient use of the fuel.

The modified form shown in Figs. 14, 15, 16, and 17 contemplate the use of three tiers of building blocks 200, 202, and 204. Each of these tiers are made up of a series of similar refractory bricks positioned in abutting relation so as to produce a complete fire brick lining for the combustion chamber 52. The lower tier of bricks 208 are substantially similar to bricks 64 and rest on the grate ring plate 46. These bricks are positioned to fit securely against the inner wall of outer casing 38 and to present a recess 66 adjacent the top thereof. Resting on bricks 208 and extending into recess 66 is a liner 210 disposed in spaced apart concentric relation to outer casing 38 to form an annular air passageway 212. Liner 210 is notched at 214 to admit air through air openings 144 and is also notched at its upper portion at 216 to admit air to the gases traveling through the vertical flues 218 produced adjacent the abutting end of adjacent bricks forming tiers 202 and 204.

Referring to Fig. 15 it will be noted that bricks 220 are each notched at their diagonal corners 222 and 224 respectively thereby presenting tongues 226 which are less than one-half the thickness of the body of the brick thereby producing vertical flues 218 when fitted together as shown. This type of vertical flue is intended to eliminate cores in the manufacture of the brick. It will be noted that bricks 220 form the top tier while bricks 228 form the intermediate tier. The bricks 220 fit snugly into the ring plate 110 and are notched at 230 to form openings to the combustion chamber. Openings 230 formed at the juncture of bricks 208 and 228 form openings which communicate with flues 218. Also openings 232 formed at the meeting planes of bricks 228 and 220 connect the combustion chamber with flues 218. This type of stove construction eliminates to a minimum the use of metal and provides a sturdy stove construction having substantially all the features present in the structure shown in Fig. 3. These bricks are secured together in substantially the same manner as those described above and can be positioned and removed by sliding them to position in alignment with the axis of the body of the outer casing.

In Fig. 3 the form of the bricks 240 are slightly modified over those shown in Fig. 15, in that grooves 242 are formed in the opposite end portions of each brick so that when the bricks are positioned flues 244 will be formed. The general construction of the stove when completed will be substantially the same as that shown in Figs. 14 and 15.

The modified form shown in Figs. 19, 20, 21, and 22 contemplates the use of bricks 300 and 302 having vertical passageways 304 and also vertical disposed outer grooves 306, whereby gas flues, and air passageways are formed from adjacent the top of the lower tier of bricks 308. The lower tier of bricks 308 rest on the grate ring 46 and are notched to present an annular recess 66. The annularly controlled air inlet 310 admits air to recess 66 thence to vertical air passageway 306 formed between the brick lining and the outer casing 38. The intermediate bricks 300 rest on top of bricks 308 and are vertically cored out to form flues 304 which communicate through openings 312 with the combustion chamber 52. It will be noted that vertical recess 304 is partially closed at 314 to preclude air from recess 66. However, gases from the combustion chamber may readily enter through openings 312 to said flue. The vertical upper tier of bricks are cored to form flues 304 which extend entirely therethrough and register with the flues formed in the brick 300 directly therebelow. The upper end portion of bricks 302 are transversely notched at 316 whereby mixing chambers for the air and gas are provided with outlets to the combustion chamber. In the operation of this type of stove the gases from the bed of fuel which pass into flues 304 are not burned until they reach the mixing chambers at 316 and are discharged into the combustion chamber above the bed of fuel. It will be noted that this form of stove eliminates the liner 218 and that the air passageways 306 are formed by the grooved outer wall of the brick and the inner wall of the outer casing 38.

This invention provides a heating stove wherein the gases evolved and the air are so controlled as to regulate the rate of burning and also to maintain substantially a perfect combustion of the gases evolved. The burning of the flue delivered gases above the bed of fuel presents a heating zone through which gases passing directly upwardly from the fuel bed must pass before reaching the flue, thereby insuring their burning.

Various modifications of the invention may be made by those skilled in the art without departing from the invention as defined in the following claims.

What I claim is:

1. In a heating stove having an outer casing and a grate construction mounted therein separating the fuel chamber from the ash pit, a plurality of liner members with vertical flues formed therethrough positioned within said outer casings and positioned in spaced relation above said grate with said flues extending upwardly from a point spaced above said grate and communicating with said fuel chamber at their lower and upper extremities, a plurality of liner members positioned between said first named liner members and grate, and each of said liner members being recessed at its outer upper edge to present a continuous annular recess between said casing and liner members to communicate with the lower extremity of said flues, and means operable to regulate the flow of air from outside the stove to said annular recess.

2. In a heating stove having an outer casing and a grate construction mounted therein separating the fuel chamber from the ash pit, a plurality of liner members with vertical flues formed therethrough positioned within said outer casing with said flues extending upwardly from a point spaced above said grate and communicating with said fuel chamber at their lower and upper extremities, a plurality of liner members each being recessed at its outer upper edge to present a horizontally disposed annular recess between said casing and liner members to communicate with the lower extremity of said flues, certain of said first named liner members being spaced from said outer casing to form an air passageway communicating with said recess and with the upper extremities of said flues, and means operable to regulate the flow of air to said air passageway.

3. In a heating stove having an outer casing and a grate construction mounted therein separating the fuel chamber from the ash pit, a tier of refractory bricks positioned against said casing and on said grate construction, said bricks being notched at their outer, upper edges to form a continuous recess, a ring liner positioned in said recess and extending upwardly therefrom in spaced relation to said outer casing to form an annular passageway therebetween, a tier of liner members including alternately disposed hollow refractory bricks and metal liners presenting vertical passageways outside the fuel chamber, said hollow bricks and metal liners being provided with passages joining the fuel chamber with said vertical passageways.

4. In a heating stove having an outer casing and a grate construction mounted therein dividing the fuel chamber from the ash pit, a tier of refractory bricks mounted on said grate construction adjacent said outer casing, each brick of said tier having its upper outer edge notched to form a continuous recess about the fuel chamber between the bricks and the outer casing, a ring liner positioned in said recess to rest on said bricks and to extend thereabove in spaced relation to the outer casing to form an annular air space therebetween, a manually controlled air inlet whereby air is admitted to said annular air space, a plurality of superimposed tiers of liner members, each of said tiers comprising alternately disposed hollow tile and metal liners carried by said tier of refractory brick, a manually controlled air inlet communicating with the flues formed through said hollow bricks, and means whereby the air admitted to said annular air space is intermixed with the gas passing through said hollow brick adjacent its upper outlet to the fuel chamber.

5. A heating stove comprising an outer casing, a grate construction mounted in said casing intermediate the top and bottom thereof whereby a combustion chamber is formed above the grate, a tier of refractory bricks having their upper outer edges notched, positioned on said grate construction to form a continuous recess with said casing, a ring liner carried by said tier of bricks and spaced apart from the inner wall of said casing to form an annular air passage therebetween, a tier of liner members including alternate hollow refractory bricks and metal liners positioned on said tier of refractory bricks to communicate with said recess whereby vertical passageways are formed in the walls of the combustion chamber, said hollow bricks being so constructed as to form passages to connect the combustion chamber with top and bottom extremities of the passageways in said hollow bricks, and manually controlled inlets whereby air is fed from outside said stove to said recesses then to said hollow tile and said annular air passageways.

6. In a heating stove of the type shown having an outer casing, a grate construction mounted in said casing separating the fuel chamber from the ash pit, a plurality of tiers of liner members carried by said grate, a top ring above said liner members, the liner members in the lowermost tier being notched at their upper outer edge to form an annular recess with the inner wall of said outer casing, an annular inner liner member positioned in said recess in spaced relation to said outer casing to form an annular air passage and to extend upwardly to a point above the upper extremities of the hollow brick tier positioned next thereabove, and an upper tier of hollow liner members formed to snugly fit into the upper extremity of said inner liner and extend thereabove to said top ring, the hollow portions of the two latter tiers coincide to form vertical passageways, said liner members being formed to present an opening therethrough to connect the fuel chamber with the vertical passageways in said liner members, and means operable to selectively introduce air into said liner passageways at their upper or lower extremities.

7. In a heating stove of the type shown having an outer casing, a grate construction mounted in said casing separating the fuel chamber from the ash pit, relatively thick lower liner members resting on said grate construction and against the inner wall of said outer casing and extending thereabove and having their upper portion recessed to form an annular recess adjacent said outer casing, upper liner members resting on said lower liner members and spaced apart from said outer casing to present a passage way therebetween communicating with said annular recess and having vertically disposed passage ways extending therethrough communicating with said annular recess, said upper liner members being provided with passages joining the fuel chamber with said vertical passage ways.

8. In a heating stove having an outer casing and a grate construction mounted therein, separating the fuel chamber from the ash pit, a plurality of liner members with vertical flues formed therethrough positioned within said outer casing with the flues extending upwardly from a point spaced above said grate and communicating with said fuel chamber at their lower and upper extremities, a plurality of liner members positioned adjacent the grate and below said first named liner members, each of said last named liner members being recessed at its outer upper edge to present a continuous annular recess between said casing and liner members to communicate with the lower extremity of said flues, means operable to regulate the flow of air from outside the stove to said annular recess, said first named liner members being spaced from said outer casing to form a passage way communicating with said recess and the upper extremity of said flues.

HUGO R. BLUMSTENGEL.